US012722299B2

(12) United States Patent
Mohr et al.

(10) Patent No.: US 12,722,299 B2
(45) Date of Patent: Sep. 1, 2026

(54) GLASS CONTAINER FORMING SYSTEM AND METHOD

(71) Applicant: Owens-Brockway Glass Container Inc., Perrysburg, OH (US)

(72) Inventors: Paul Mohr, Waterville, OH (US); John Holmes-Libbis, Perrysburg, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 190 days.

(21) Appl. No.: 18/525,038

(22) Filed: Nov. 30, 2023

(65) Prior Publication Data

US 2024/0181643 A1 Jun. 6, 2024

Related U.S. Application Data

(60) Provisional application No. 63/429,759, filed on Dec. 2, 2022.

(51) Int. Cl.
*B25J 9/16* (2006.01)

(52) U.S. Cl.
CPC .......... *B25J 9/1674* (2013.01); *B25J 9/1694* (2013.01)

(58) Field of Classification Search
CPC .......... C03B 9/18–19; C03B 9/22–225; C03B 9/295–2955; C03B 11/02; B25J 9/1694
See application file for complete search history.

(56) References Cited

U.S. PATENT DOCUMENTS

| | | | | |
|---|---|---|---|---|
| 4,597,698 | A * | 7/1986 | Liebetrau | F16P 1/02 409/134 |
| 5,064,328 | A * | 11/1991 | Raker | B42C 19/08 227/1 |
| 5,597,396 | A | 1/1997 | Tohjo | |
| 5,988,645 | A * | 11/1999 | Downing | F41J 5/02 250/222.2 |
| 7,030,363 | B2 | 4/2006 | Waranabe et al. | |
| 7,221,119 | B2 | 5/2007 | Hashimoto et al. | |
| 8,240,171 | B2 | 8/2012 | Balbi | |

(Continued)

FOREIGN PATENT DOCUMENTS

| | | | |
|---|---|---|---|
| EP | 3296611 | A1 | 3/2018 |
| JP | H0930831 | A | 2/1997 |
| WO | WO20180206279 | A1 | 11/2018 |

OTHER PUBLICATIONS

Mecalux. "Wire Mesh Partitions & Cages". [online] [retrieved Oct. 6, 2025]. Retrieved from Microsoft Bing, <https://www.mecalux.com/wire-mesh-partitions-cages>, Oct. 11, 2016. (Year: 2016).*

(Continued)

*Primary Examiner* — Erin Snelting

(57) ABSTRACT

A glass container forming system and method for operating a glass container forming system. The glass container forming system includes: a plurality of workstations, each of which includes an equipment area and zone partitioning; one or more object detectors configured to obtain sensor data of an operator access area of one or more of the plurality of workstations, and/or a carriage carrying a robot; a plurality of glass container forming machines located within the plurality of workstations; and a control system for performing the method and/or otherwise operating the glass container forming machine.

23 Claims, 9 Drawing Sheets

(56) References Cited

U.S. PATENT DOCUMENTS

| | | | | |
|---|---|---|---|---|
| 8,375,743 | B2 | 2/2013 | Zanella et al. | |
| 8,989,900 | B2 | 3/2015 | Nakamura et al. | |
| 9,737,992 | B2 | 8/2017 | Mougin et al. | |
| 9,764,474 | B2 * | 9/2017 | Yamamoto | B25J 19/022 |
| 9,782,897 | B2 | 10/2017 | Waranabe et al. | |
| 10,016,898 | B2 | 7/2018 | Waranabe et al. | |
| 10,099,372 | B2 | 10/2018 | Vu et al. | |
| 10,503,143 | B1 | 12/2019 | Polic | |
| 10,618,170 | B2 | 4/2020 | Takahashi et al. | |
| 11,312,021 | B2 | 4/2022 | Sejimo | |
| 11,325,258 | B2 | 5/2022 | Goto | |
| 11,345,034 | B2 | 5/2022 | Yamada | |
| 11,440,188 | B2 | 9/2022 | Morioka et al. | |
| 2009/0173105 | A1 * | 7/2009 | Zanella | C03B 40/027 65/159 |
| 2011/0052366 | A1 | 3/2011 | Bonin et al. | |
| 2017/0036347 | A1 | 2/2017 | Bonin et al. | |
| 2017/0304908 | A1 * | 10/2017 | Travert | B23Q 3/15706 |
| 2018/0099435 | A1 | 4/2018 | Maran et al. | |
| 2023/0398689 | A1 * | 12/2023 | Brown | B25J 9/0093 |

OTHER PUBLICATIONS

PCT Search Report and Written Opinion, Int. Application No. PCT/US2023/082014, Int. Filing Date: Dec. 1, 2023, Applicant: Owens-Brockway Glass Container Inc., Dated: Jun. 11, 2024.

* cited by examiner lateral direction
longitudinal direction
10
12
12-1
12-2
12-3
12-4
13
14
14-1
14-2
14-3
14-4
16
18-1
18-2
18-3
18-4
20
22
24
26
28
30
30-1
30-2
30-3
30-4
30-5
32
32-1
32-2
32-3
32-4
32-5
34
34-1
34-2
34-3
34-4
36
38
40
42
44
46
48
50
52
54
55
56
56a
56b
56c
57
58
58-1
58-2
58-3
58-4
60
60-1
60-2
60-3
60-4
62
62-1
62-2
62-3
62-4
63
65
N 10
77
77a
71
16
68a
70a
54a
54b
58-1
74a
54c
70b
58-2
54d
54e
74b
68d
56a
56b
62-1
68c
62-2
72a
76a
68b
66
64a
64b
78a
78b
76b
78c
73a
73b
78d
78e
76c
73c
54f
74c
56c
54g
58-3
78g
68e
62-3
78f
78h
54h
58-4
54i
62-4
78i
64d
72b
76d
68f
64c 68a
18-1
10
16
76a
68b
64a
66
62-1
64b
58-1
58-4
62-4

Figure 7:
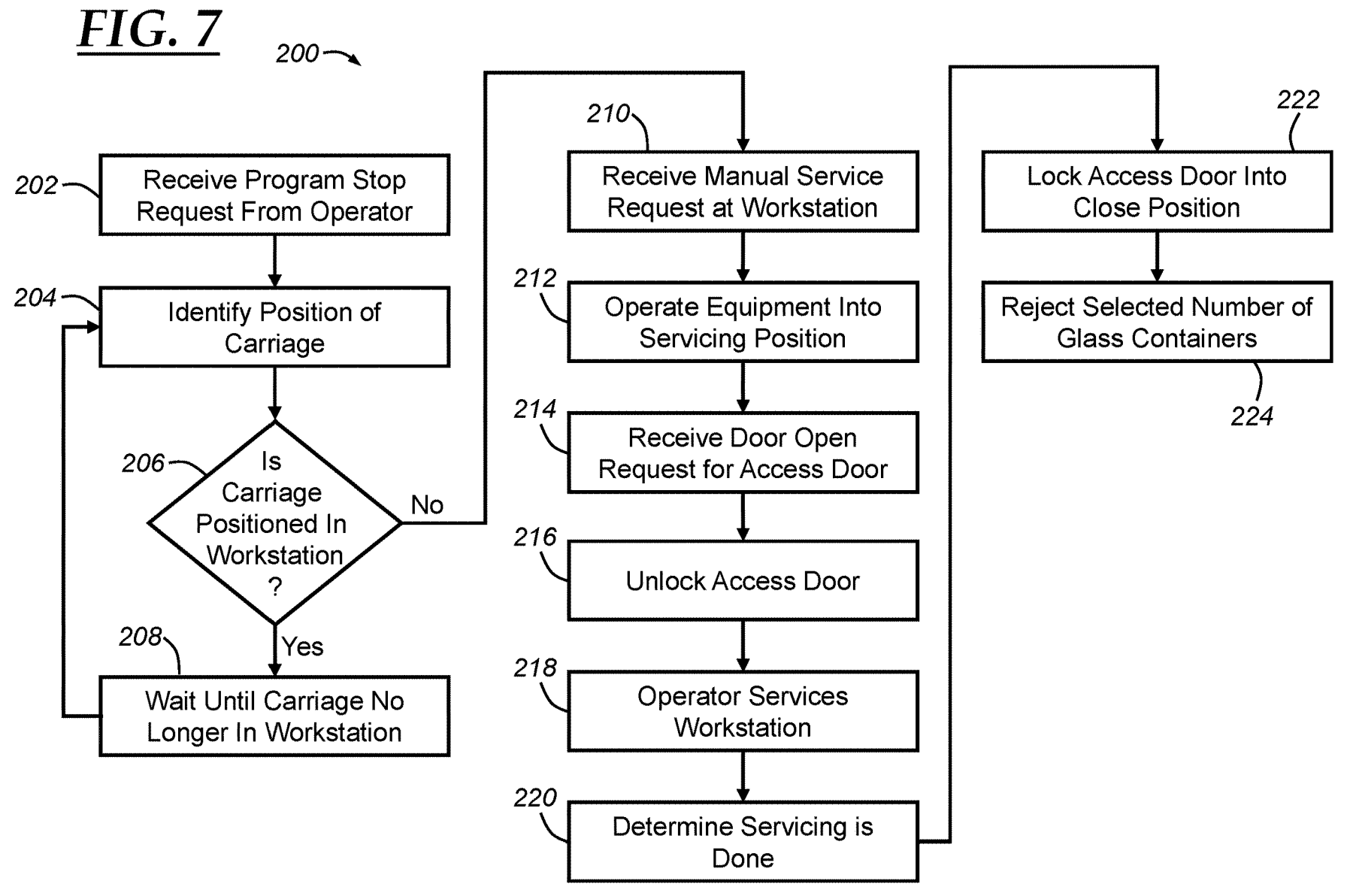

202 Receive Program Stop Request From Operator

204 Identify Position of Carriage

206 Is Carriage Positioned In Workstation ?

Yes

208 Wait Until Carriage No Longer In Workstation

No

210 Receive Manual Service Request at Workstation

212 Operate Equipment Into Servicing Position

214 Receive Door Open Request for Access Door

216 Unlock Access Door

218 Operator Services Workstation

220 Determine Servicing is Done

222 Lock Access Door Into Close Position

224 Reject Selected Number of Glass Containers

Figure 8:
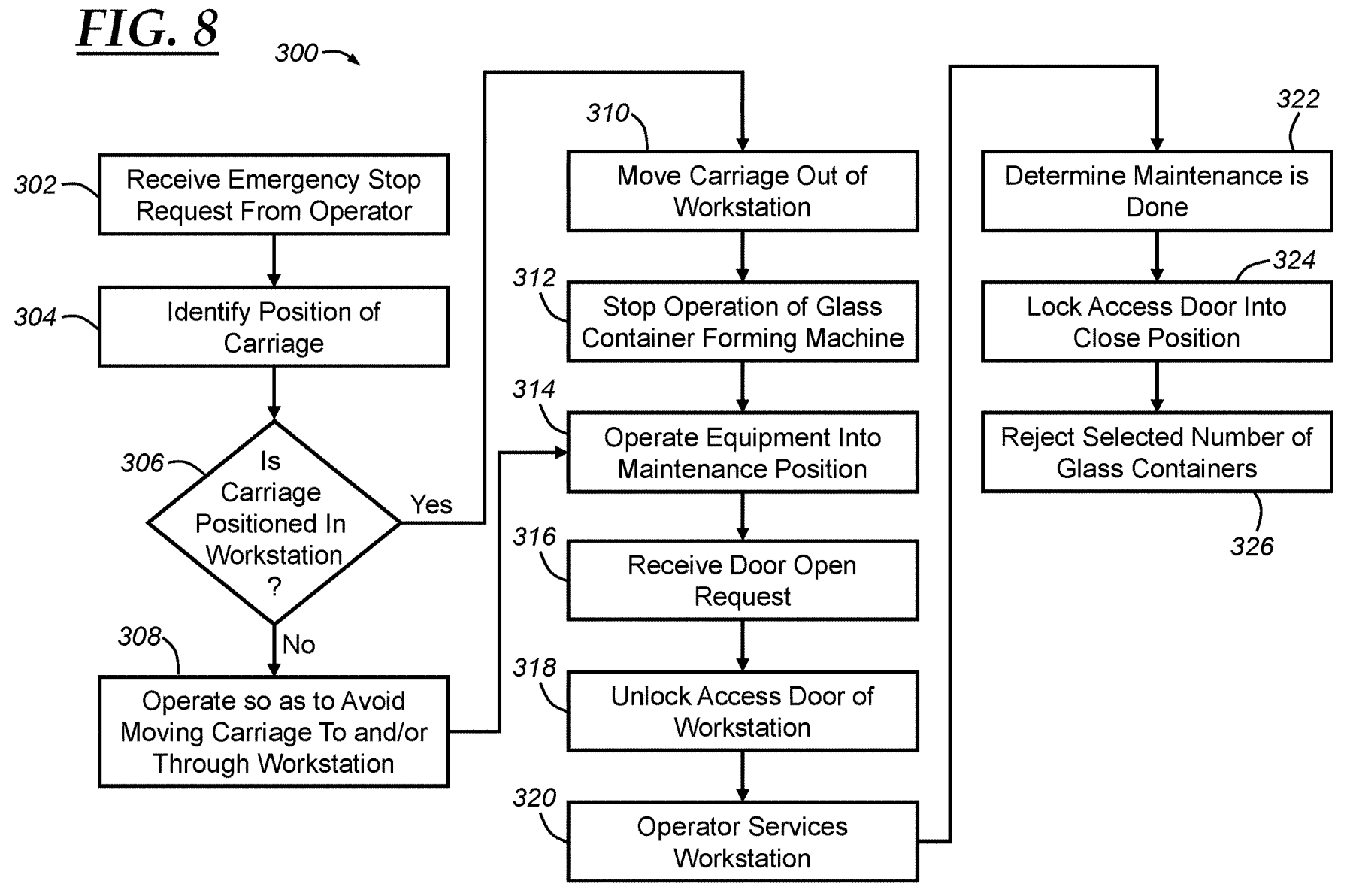

302 Receive Emergency Stop Request From Operator

304 Identify Position of Carriage

306 Is Carriage Positioned In Workstation ?

Yes

No

308 Operate so as to Avoid Moving Carriage To and/or Through Workstation

310 Move Carriage Out of Workstation

312 Stop Operation of Glass Container Forming Machine

314 Operate Equipment Into Maintenance Position

316 Receive Door Open Request

318 Unlock Access Door of Workstation

320 Operator Services Workstation

322 Determine Maintenance is Done

324 Lock Access Door Into Close Position

326 Reject Selected Number of Glass Containers

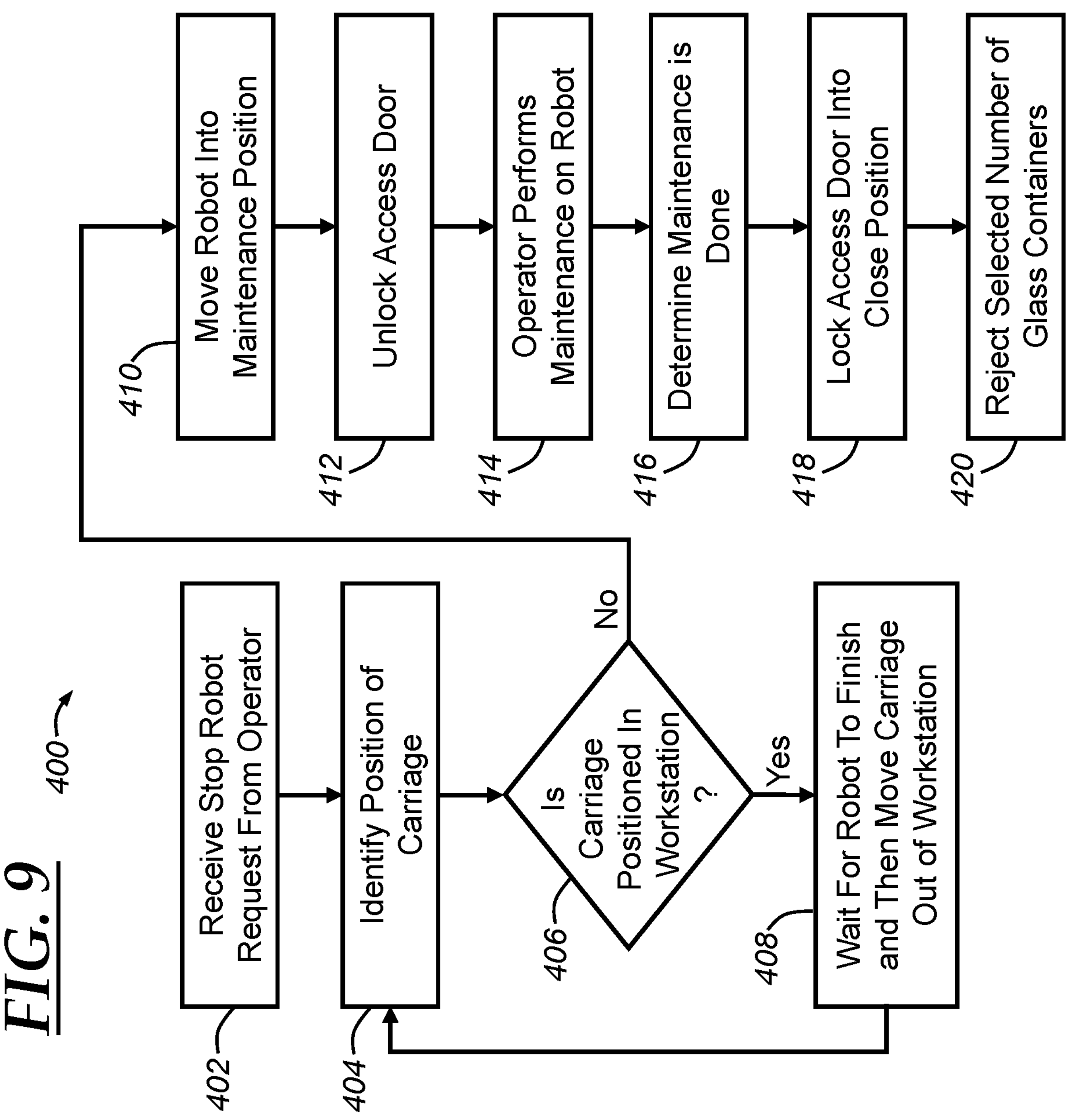
FIG. 9
400
Receive Stop Robot Request From Operator
402
Identify Position of Carriage
404
Is Carriage Positioned In Workstation ?
406
Yes
No
Wait For Robot To Finish and Then Move Carriage Out of Workstation
408
Move Robot Into Maintenance Position
410
Unlock Access Door
412
Operator Performs Maintenance on Robot
414
Determine Maintenance is Done
416
Lock Access Door Into Close Position
418
Reject Selected Number of Glass Containers
420

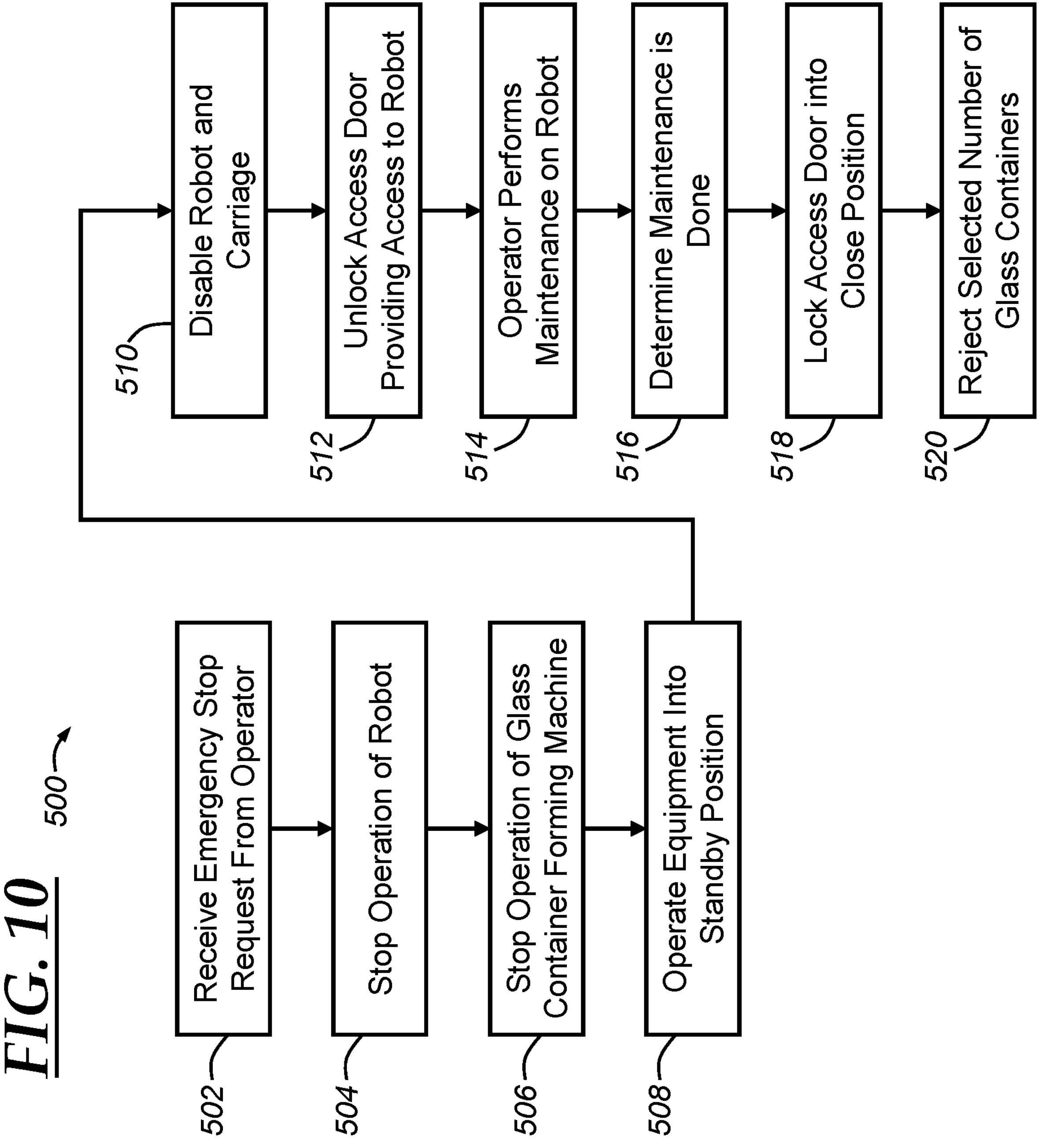
FIG. 10
500
Receive Emergency Stop Request From Operator
502
Stop Operation of Robot
504
Stop Operation of Glass Container Forming Machine
506
Operate Equipment Into Standby Position
508
Disable Robot and Carriage
510
Unlock Access Door Providing Access to Robot
512
Operator Performs Maintenance on Robot
514
Determine Maintenance is Done
516
Lock Access Door into Close Position
518
Reject Selected Number of Glass Containers
520

GLASS CONTAINER FORMING SYSTEM AND METHOD

TECHNICAL FIELD

This disclosure relates to glass container forming machines and, more particularly, individual section (IS) machines having automated components in an equipment area surrounded at least partly by zone partitioning.

BACKGROUND

In a glass container manufacturing system, a glass melting subsystem typically includes a furnace that receives feedstock and melts it into molten glass, and molten glass conditioning equipment downstream of the furnace that receives the molten glass from the furnace and chemically and/or thermally treats the molten glass until it is in a condition suitable for manufacturing glass containers. The glass container manufacturing system also usually includes a gob feeder at the end of a forehearth to produce molten glass gobs that drop, for example through troughs, deflectors, and/or other gob delivery equipment, down to a glass container forming machine known as an individual section (IS) machine.

The IS machine typically includes two to sixteen individual sections of identical construction positioned side-by-side in a longitudinal row and configured to be operated out of phase with one another to provide a continuous flow of glass containers on a conveyor downstream of the IS machine. Each section includes a blank side with "blanks" or blank molds to receive the molten glass gobs from above and form parisons from the gobs. Each section also includes a blow side with blow molds spaced transversely from the blank side to receive parisons from the blank side and form glass containers from the parisons. Each section further includes a parison inverter having an invert arm rotatable about a longitudinal axis and carrying neck rings that carry the parisons by their necks from the blank side to the blow side.

Periodically, portions of the equipment are "swabbed" or lubricated with a lubricant to ensure that glass can release from the equipment. Swabbing of IS machines may include manual swabbing of the blank molds and/or the neck rings with a liquid lubricant via swab brushes, or may include automatic liquid lubricant spraying or flame-generated lubricant sooting of the blank molds and/or the neck rings.

Operation of the IS machine includes numerous moving parts throughout the individual sections, especially in IS machines employing automatic swabbing implements. Interference with the machinery during operation may cause the IS machine to malfunction, shutdown, and/or otherwise slow down processing.

SUMMARY OF THE DISCLOSURE

According to an embodiment of the present disclosure, a glass container forming system is provided and includes: a plurality of workstations each arranged adjacent to at least one other workstation of the plurality of workstations and each including an equipment area and zone partitioning for the plurality of workstations, wherein, for each of the plurality of workstations, the zone partitioning includes an access doorway that is selectively closed and opened by an access door, wherein each of the plurality of workstations include a door interlock and a door sensor for the access door, and wherein the door sensor provides a door open indicator that indicates a door closed state or a door open state; one or more object detectors configured to obtain sensor data of an operator access area of one or more of the plurality of workstations; a plurality of glass container forming machines located within the plurality of workstations, wherein each of the plurality of glass container forming machines is located within the equipment area of a different one of the plurality of workstations; and a control system configured to: receive the sensor data from the one or more object detectors, receive the door open indicator from the door sensor of the access door for each of the plurality of workstations, and control an operating state of the glass container forming system based on the door open indicator and the sensor data.

According to another embodiment, a glass container forming system is provided and includes: a plurality of workstations each arranged adjacent to at least one other workstation of the plurality of workstations and each including an equipment area and zone partitioning for the plurality of workstations; a plurality of glass container forming machines located within the plurality of workstations, wherein each of the plurality of glass container forming machines is located within the equipment area of a different one of the plurality of workstations; an object detector mounted to the zone partitioning and configured to capture sensor data of a first workstation of the plurality of workstations; and a control system configured to receive information from the one or more object detectors, and to control an operating state of the glass container forming system based on the captured sensor data.

According to yet another embodiment, a glass container forming system is provided and includes: a plurality of workstations each arranged adjacent to at least one other workstation of the plurality of workstations and each including an equipment area, a robot station, and an operator access area; zone partitioning for the plurality of workstations; a plurality of glass container forming machines located within the plurality of workstations, wherein each of the plurality of glass container forming machines is located within the equipment area of a different one of the plurality of workstations; and a carriage carrying a robot and being traversable along a rail that runs through the robot station of each of the plurality of workstations, wherein each robot station of the plurality of robot stations is located at one of the plurality of workstations.

BRIEF DESCRIPTION OF THE DRAWINGS

FIG. 7 is a flowchart illustrating a method of performing an operator access tagout procedure for permitting an operator to access an equipment area of a glass container forming machine, according to one embodiment.

FIG. 8 is a flowchart illustrating a method of performing an operator emergency access procedure for permitting an operator to access an equipment area of a glass container forming machine, according to one embodiment.

FIG. 9 is a flowchart illustrating a method of performing an operator access tagout procedure for permitting an operator to access a servicing robot used for servicing a glass container forming machine, according to one embodiment.

FIG. 10 is a flowchart illustrating a method of performing an operator emergency access procedure for permitting an operator to access a servicing robot used for servicing a glass container forming machine, according to one embodiment.

DETAILED DESCRIPTION

Figure 1:
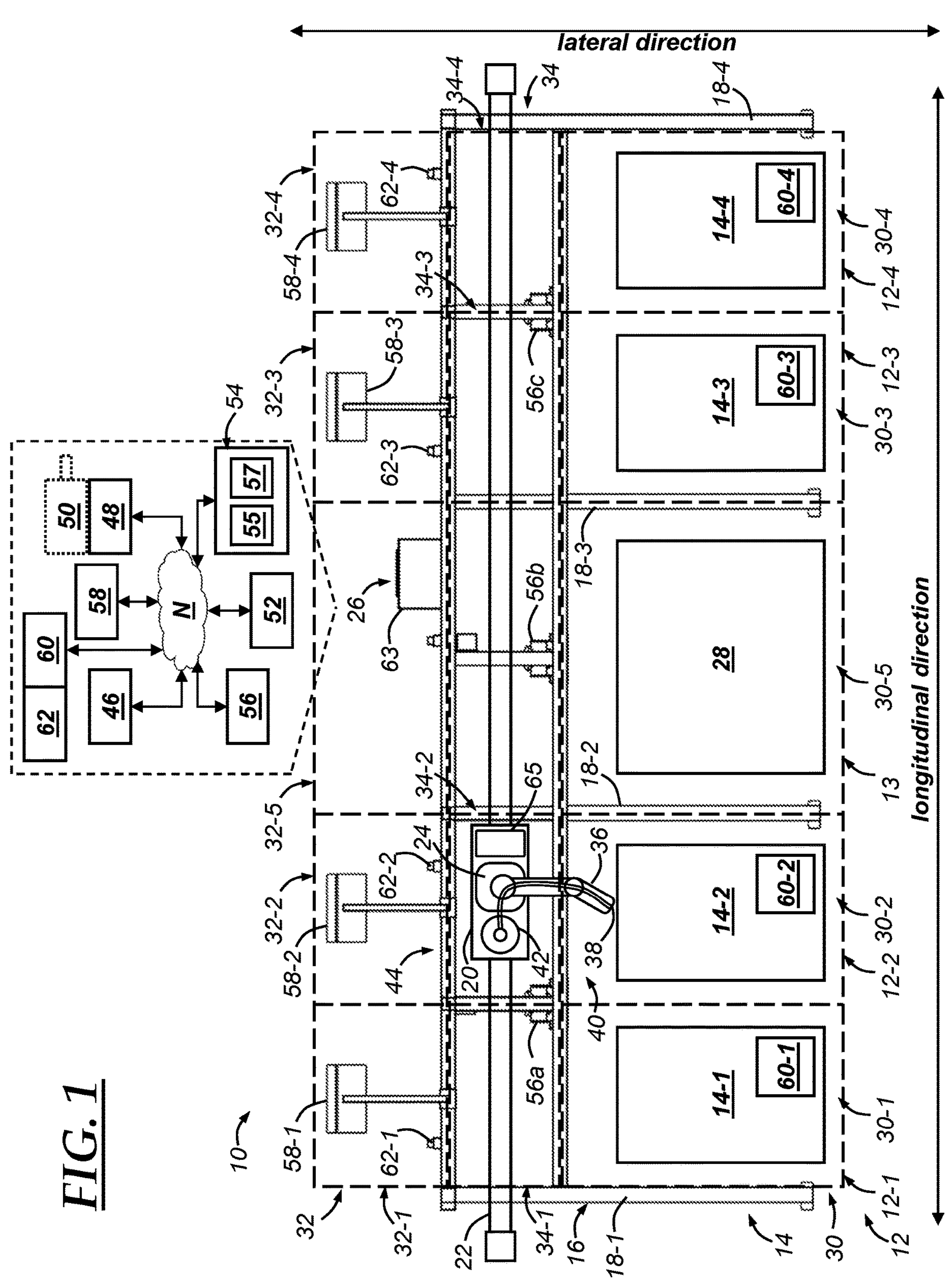
FIG. 1 is a plan, schematic view of a glass container forming system, according to an embodiment of the present disclosure.

In general, systems and methods are disclosed below for glass container forming machines and, particularly, a glass container forming system having an individual section (IS) machine comprising a plurality of glass container forming machines (corresponding to individual sections) that are each physically partitioned using zone partitioning extending at least along a perimeter portion of an equipment area in which the glass container forming machine is located. In embodiments, the glass container forming system further comprises a carriage traversable along a longitudinal rail between the glass container forming machines of the individual sections of the IS machine, and a robot is carried on the carriage and configured to apply lubricant to the glass container forming machines. The zone partitioning is used to physically delineate and separate regions in which automated operations of the IS machine (or other automated machinery) are performed thereby increasing efficiency of work output of the equipment in the work zones due to reducing likelihood of external interference with equipment operations.

In embodiments, a control system having at least one controller is used to control operation of machinery within the IS machine and to control movement of the carriage along the longitudinal rail. In embodiments, the control system includes a robot controller for controlling movement of robot (e.g., robotic arm movement), a carriage motor controller for controlling movement of the carriage along the longitudinal rail, and a coordination controller for generating and transmitting both a robot control signal that is sent to the robot controller so as to cause a change of operation of the robot and a carriage motor control signal that is sent to the carriage motor controller so as to cause a change of operation of the electric carriage motor. According to some embodiments, the coordination controller is configured to determine a robot operating state, a carriage operating state, and a workstation environment state, and to then generate the robot control signal and the carriage motor control signal based on the robot operating state, the carriage operating state, and the workstation environment state. The robot operating state is any indication of an operation of the robot, such as a position of the robotic arm and/or a robot servicing status. The carriage operating state indicates a position of the carriage along the rail, such as an identifier or numerical value indicating the position of the carriage. The workstation environment state is an indication of a state of the environment of the glass container forming system that is obtained through sensor data captured by a sensor; examples of a workstation environment state include an indication of a person within a workstation, an indication of an errant object located on the longitudinal rail, and/or an ambient temperature of the workstation.

In embodiments, the zone partitioning includes at least one access door that permits an operator in an operator access area to access the equipment area of a workstation at which a glass container forming machine is located, such as for purposes of performing a manual swabbing operation on and/or inspection of the glass container forming machine, for example. In one embodiment, the system may further include a door sensor that captures sensor data indicating whether the access door is opened or closed (referred to as a door open indicator). Furthermore, in embodiments, the system includes an object detector that is configured to detect presence of an object or person through capturing sensor data of an area of or adjacent to the workstation; in embodiments, the object detector and/or system is configured to ignore components of the system and only return a positive detection when detecting an out-of-place object within the object detector's field of view (FOV) and/or when detecting a disarrangement or dislocation of components of the system. The door open indicator or an object detector indicator indicating a positive detection by the object detector may be used as the workstation environment state, according to embodiments.

With specific reference to FIG. 1, and according to a first embodiment of the present disclosure, a glass container forming system 10 includes a plurality of workstations 12 (for example, four workstations 12-1,12-2, 12-3,12-4 as shown in FIG. 1), a plurality of glass container forming machines (for example, four glass container forming machines 14-1,14-2,14-3,14-4 as shown in FIG. 1), zone partitioning 16 extending along at least a perimeter portion 18-1,18-2,18-3,18-4 of the plurality of workstations 12, a carriage 20, a longitudinal rail 22 along which the carriage 20 moves, a robot 24 carried by the carriage 20, and a control system 26. In other embodiments, the system 10 may include any other suitable arrangement of workstations 12 and glass container forming machines 14. In the depicted embodiment, four workstations 12-1,12-2,12-3,12-4 each include a glass container forming machine 14-*w*, where w is an index for the workstation. Other equipment 28, which may be equipment other than a glass container forming machine, may be located at other areas between defined by the zone partitioning 16, such as between a second workstation 12-2 and a third workstation 12-3 as depicted in FIG. 1. For example, the glass container forming system 10 includes an additional area 13 without a glass container forming machine and this area 13 is located between two workstations 12-2, 12-3 and partitioned by the zone portioning 18-2,18-3. In embodiments, any suitable and/or desired configuration of workstations 12, including configurations within individual workstations such as the arrangement and number of glass container forming machines 14 and/or other equipment 28, may be used. For example, a workstation having a glass container forming machine as well as other equipment may be used.

Each of the four workstations 12-1,12-2,12-3,12-4 includes an equipment area 30 (30-1,30-2,30-3,30-4,30-5) having the glass container forming machines 14 or the other equipment 28. In embodiments, the equipment in each of the workstations 12 further includes an operator access area 32 (32-1,32-2,32-3,32-4,32-5) and a robot station 34 (34-1,34-2,34-3,34-4) disposed laterally between the equipment area

30 and the operator access area 32. In other embodiments, the longitudinal rail 22 extends longitudinally past the plurality of workstations 14 and to an area where there is no glass container forming machine and the carriage 20 may be positioned at this area. The other equipment 28 is also located in an equipment area 30-5. In other embodiments, an operator access area and/or robot station may be provided for accessing other equipment in a manner similar to that discussed herein for providing access to the glass container forming machines 14.

The glass container forming machines 14 may be blank mold stations, each including a blank side frame, a blank plunger apparatus carried by the blank side frame, a blank mold holder apparatus movably carried by the blank side frame and blank molds, which may be carried by the blank mold holder apparatus. The blank mold stations also each may include a baffle apparatus carried by the blank side frame, an inverter apparatus that may be carried by the blank side frame, and a mold funnel apparatus that may be carried by the frame. In other embodiments, the glass container forming machines 14 may be blow mold stations, each including a blow side frame, a bottom plate apparatus carried by the blow side frame, a blow mold holder apparatus movably carried by the blow side frame and blow molds, which may be carried by the blow mold holder apparatus. The blow mold stations also each may include a blowhead apparatus carried by the blow side frame, and a takeout apparatus carried by the blow side frame. Additionally, the blank and/or blow mold stations may also include mold cooling circuits and valves, electrical wiring and components, and any other equipment suitable for use with an individual section machine.

In the depicted embodiment, the robot 24 is used for servicing the glass container forming machines 14 (or other equipment) in the workstations 12. In particular, the robot 24 includes a robotic arm 36 that is used to position a nozzle 38 of a lubricant applicator subsystem 40, which includes a lubricant tank 42. As used herein, "onboard" means carried on the carriage of the system, such as the carriage 20 in the present embodiment. As shown in the depicted embodiment, the robot 24 and the lubricant applicator subsystem 40 are each onboard and together form an automated robotic glass container forming machine swabbing system (for simplicity referred to as an "automated robotic swabbing system") and, particularly, an onboard automated robotic swabbing system 44, which uses the robotic arm 36 of the robot 24 to position the nozzle of the lubricant applicator subsystem 38.

The lubricant applicator subsystem 40 is used to apply lubricant from the lubricant tank 42 onto equipment of a workstation, for example, a mold of a glass container forming machine. In embodiments, the onboard automated robotic swabbing system 44 is arranged along a blank side of a glass container forming system and the lubricant applicator subsystem 40 is used to apply lubricant to blank molds of the glass container forming system. In embodiments, an air pressurizer, such as an air compressor, is used to create air pressure used as a part of the lubricant applicator subsystem 40 to thereby force lubricant out of the nozzle 38. In embodiments, the air pressurizer is carried onboard the carriage 20; in other embodiments, the air pressurizer is located elsewhere and hoses are used for communicating a generated air pressure to the lubricant applicator subsystem 40.

The control system 26 includes a robot controller 46 for controlling movement of the robot 24 (e.g., movement of the robotic arm 36), a carriage motor controller 48 for controlling an electric motor (referred to as electric carriage motor) 50 that moves the carriage 20 along the longitudinal rail 22, and a coordination controller 52 for generating and transmitting a robot control that is sent to the robot controller 46 in order to cause a change of operation of the robot 24 and a carriage motor control signal that is sent to the carriage motor controller 48 in order to cause a change of operation of an electric carriage motor 50 that drives the carriage 20 so as to move the carriage 20 along the rail 22. According to some embodiments, the coordination controller 52 is configured to determine a robot operating state of the robot 24, a carriage operating state of the carriage 20, and a workstation environment state of the plurality of workstations 12, and to then generate the robot control signal and the carriage motor control signal based on the robot operating state, the carriage operating state, and the workstation environment state. The robot operating state is any indication of the operation of the robot 24, such as a position of the robotic arm 34 or a robot servicing status. The robot operating state may be determined by receiving information from the robot controller 46 and/or from a sensor external to the robot, such as from a camera or other optical sensor. The carriage operating state indicates a position of the carriage 20 along the rail 22, such as an identifier or numerical value indicating the position of the carriage 20. The carriage operating state may be determined based on position information received from the carriage motor controller 48 and/or from sensor data from a sensor that indicates a position of the carriage; for example, object detectors (discussed below) may be used to detect whether the carriage and/or robot are in a particular robot station. The workstation environment state is an indication of a state of the environment of the system 10 that is obtained through sensor data captured by a sensor; examples of a workstation environment state include an indication of a person within a workstation 12, an indication of an errant or out-of-place object located on the longitudinal rail, and/or an ambient temperature of the workstation. In embodiments, the sensor used for the workstation environment state may be an optical sensor, such as a camera, or may be another type of sensor, such as a thermometer.

The control system 26 further includes other electronic components, including a plurality of door interlock modules 54, a plurality of object detectors 56 (shown also as 56*a*, 56*b*,56*c*), a plurality of workstation user interfaces 58 (shown also as 58-1,58-2,58-3,58-4), equipment system controllers 60 (shown also as 60-1,60-2,60-3,60-4), and equipment system user interfaces 62 (shown also as 62-1, 62-2,62-3,62-4), which may be coupled to a respective one of the equipment system controllers 60. The electronic components 46,48,52,54,56,58,60 are all shown as being connected to an electronic data network N, which may be implemented via a variety of suitable communication means for communicating information among the electronic components, such as through using a local area network (LAN) (e.g., wireless LAN), controller area network (CAN), or any other network suitable for use in a manufacturing environment. Although the electronic data network N is discussed herein using the singular form, the electronic data network N may include a plurality of electronic data networks; for example, the coordination controller 52 and the door interlock modules 54 may communicate using a first data network that is a LAN and the equipment system controllers 60 and the workstation user interfaces 58 may communicate using a second data network that is a CAN; further, for example, the coordination controller 52 and the object detectors 56 may communicate using a third data network that is Wi-Fi.

The control system 26 also includes electrical cabinetry 63,65, including cabinetry 63 fixed to a frame of the zone partitioning 16, as well as onboard cabinetry 65. Together, the electrical cabinetry 63,65 may house one or more (such as all) of the components of the control system 26. The electrical cabinetry 63,65 may be comprised of a housing having a cabinet door, and these components may be comprised of any suitable material, such as high-density plastics and/or metals. In embodiments, the electrical cabinet 63,65 carries at least one processor and memory storing computer instructions, wherein the at least one processor is configured to execute the computer instructions so as to cause the at least one processor to perform one or more operations, such as those pertaining to the carriage motor controller 48, for example. In embodiments, the electrical cabinet 63,65 includes a variety of electronics and related equipment, such as, for example, a solenoid used to control flow of air and/or lubricant that is used as a part of the lubricant applicator subsystem 40.

Each of the door interlock modules 54 (nine modules 54*a-i* in FIG. 2) includes a door interlock 55 and a door sensor 57 that is used to determine a door open state of an access door, such as an access door for an access doorway disposed within the zone partitioning 16. According to embodiments, the door sensor is a contact sensor that is closed when the door is closed and open when the door is open thereby indicating the door open state. In one embodiment, the door interlocks are each a safety interlock switch, which may use electromagnetic locking for holding and/or aligning a door.

Each of the object detectors 56 is used to detect a presence of an object or person through capturing sensor data of an area of or adjacent to the workstation, such as within the equipment area 30, the operator access area 32, and/or the robot station 34. In some embodiments, at least one of the object detectors 56 (or all detectors 56) is an optical sensor that scans a region using electromagnetic radiation, such as through emitting infrared energy and receiving a reflected response. For example, the object detectors 56 may be a motion detector, such as, where the optical sensor is a safety laser scanner, such as a S3000 manufactured by SICK AG. In other embodiments, other types of sensors may be used. The object detectors 56 each may include one or more predefined or specified resolutions, such as an angular resolution (or azimuth angle, measured in degrees) and object resolution (indicating minimum detection resolution, measured in millimeters).

In embodiments, one or more of the object detectors 56 is configured to detect presence of an object or person through capturing sensor data of an area of or adjacent to the workstation, and the control system 26 may be configured to receive detection information from the object detectors 56 and to process the object detectors 56 to ignore components of the system 10 so as to only return a positive detection when detecting an out-of-place object within the object detector's field of view (FOV) and/or when detecting a disarrangement or dislocation of components of the system.

Each of the workstation user interfaces 58 is used for receiving input from a user regarding equipment located in the associated equipment area 30, such as to stop or suspend operation of a process being performed by the equipment. In embodiments, each of the workstation user interfaces 58 is used for receiving an emergency stop command and includes an E-STOP button for receiving the emergency stop command. Also, in one embodiment, each of the workstation user interfaces 58 includes a manual service (or manual swab) button that is used for receiving a request to perform a manual swab or other service. Mushroom switches, pushbuttons, and other electromechanical switches and electronics may be used to implement each of the workstation user interfaces 58, according to embodiments. In other embodiments, each of the workstation user interfaces 58 is a computer that includes an electronic display, such as a touchscreen, and is configured to receive user input. According to embodiments, the workstation user interfaces 58 may be implemented using a variety of different electronic devices, as will be appreciated by those skilled in the art.

The equipment system controllers 60 (four shown-one for each glass container forming machine 14) are each used to control a respective glass container forming machine 14. It should be appreciated that the equipment system controllers 60 includes one or more computers, processors, memory and/or other electronic components, any or all of which may be co-located and packaged as a single device and/or distributed as multiple physical devices. For example, although the first equipment system controller 60-1 is shown as being separate from the second equipment system controller 60-2 in FIG. 1, in other embodiments, a single computer or processor may be used for both controllers. In embodiments, a main system or main IS controller is also used, which is able to control operation of the individual sections (or glass container forming machines 14) in the workstations 12. Each of the equipment system controllers 60 is a glass container forming machine controller that is used for controlling operation of a respective glass container forming machine 14, such as to stop operation in response to an emergency stop command and/or to perform a predetermined operation and/or assume a predetermined position.

Each equipment system user interface 62-1,62-2,62-3, 62-4 is used to provide a user with control to operation of equipment in the equipment area, such as to stop a glass container forming machine or to place the glass container forming machine into a predetermined state, such as into a maintenance position. In one embodiment, each equipment system user interface 62 includes an E-STOP or emergency stop button, which may be implemented as an electromechanical pushbutton that, when depressed, causes an emergency stop signal to be sent to a respective glass container forming machine 14 so as to stop operation of the glass container forming machine 14 (or otherwise place it into a predetermined state). Of course, other inputs may be provided by the equipment system user interface 62 so that an operator may control various aspects of the equipment operating in the equipment area.

Figure 2:
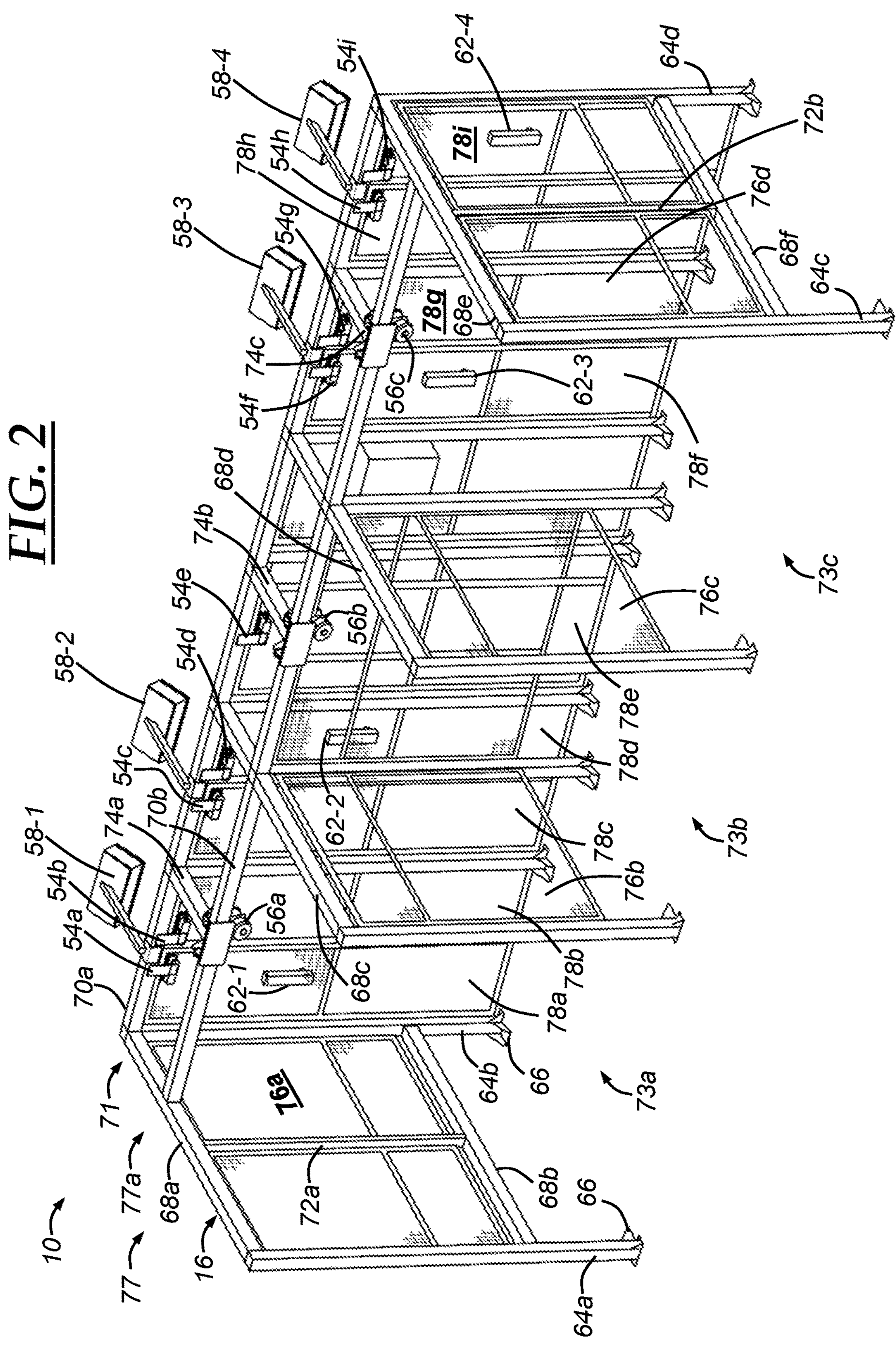
FIG. 2 is a perspective view of a portion of the glass container forming system of FIG. 1, particularly, showing zone partitioning of the glass container forming system of FIG. 1.

With reference to FIG. 2, there is shown the zone partitioning 16 and other components of the glass container forming machine 10, including the door interlock modules 54, the object detectors 56, the workstation user interfaces 58, and the equipment system user interfaces 62. The zone partitioning 16 includes vertical supports 64*a-d* having feet 66 comprising a planar mounting flange for securing the vertical support to the ground. The zone partitioning 16 further includes lateral horizontal supports 68*a-f* extending respectively between vertical supports 64*a-d* and longitudinal horizontal supports 70*a*,70*b* extending between the horizontal supports 68*a*,68*e*, forming a longitudinal frame 71 that extends between the plurality of workstations 12. The zone partitioning 16 includes a plurality of lateral frames 73*a-c*, each of which extends orthogonally from the longitudinal frame 71. Moreover, each of the plurality of lateral frames 73*a-c* defines the perimeter portion of a corresponding one of the plurality of workstations 12.

The zone partitioning 16 also includes intermediary vertical supports 72*a*, 72*b*, as well as intermediary lateral horizontal supports 74*a*,74*b*,74*c*. The supports are rigid and act together as a frame for the zone partitioning 16, particularly, for supporting zone partitions 76*a-d* and/or access doors 78*a-i* that are installed in the areas spanning between the supports, as shown in FIG. 2. The zone partitioning 16 may include additional like components that are depicted but that are not labeled separately for purposes of readability.

The supports together make a frame and the supports may be comprised of a rigid material, such as steel, other metals, etc. The zone partitions 76*a-d* are formed of walls physically partitioning two areas and may be made of any suitable material, such as chain link fencing, fence mesh, other fencing (referred to as "fence" or "fencing"), metal sheets, etc. In embodiments, the zone partitions 76*a-d* may be semi-transparent; however, in other embodiments, the zone partitions 76*a-d* may be opaque. The vertical supports 64*a-d*, lateral horizontal supports 68*a-e*, longitudinal horizontal supports 70*a-b*, intermediary vertical supports 72*a-b* are used to form various frames 77 to which the zone partitions 76*a-d*, such as fencing or metal sheets, may be attached and fixed to. For example, a frame 77*a* for zone partition 76*a* is shown as being formed by intermediary vertical support 72*a*, vertical support 64*b*, and lateral horizontal supports 68*a-b*. Other such frames 77 are shown in the depicted embodiment, but not specifically referenced.

Each of the access doors 78*a-i* is used to selectively open and close an access doorway. The access doorway is an area within the zone partitioning that permits operator access, such as for an operator to walk through, for an operator to insert an arm into, or for an operator to insert a tool within for manual operation of the tool. In the depicted embodiment, each of the access doorways corresponding to the access doors 78*a-i* is defined by at least partly by supports, such as, for example, horizontal longitudinal support 70*a* and vertical supports 64*b*,64*d*. Any suitable door or panel may be used for the access door along with any of a variety of mechanisms for securing the door in a close position, such as through the use of hinges, rotatable tabs, etc. In the illustrated embodiment, each access door 78*a-i* has an associated door interlock module 54*a-i* and the door sensor of the associated door interlock module 54 is used to determine whether the access door is open. In other embodiments, the zone partitioning may include one or more access doorways without an access door; rather, another object for preventing access and/or detecting access may be used at the access doorway, such as a light curtain, for example.

Figures 3, 4:
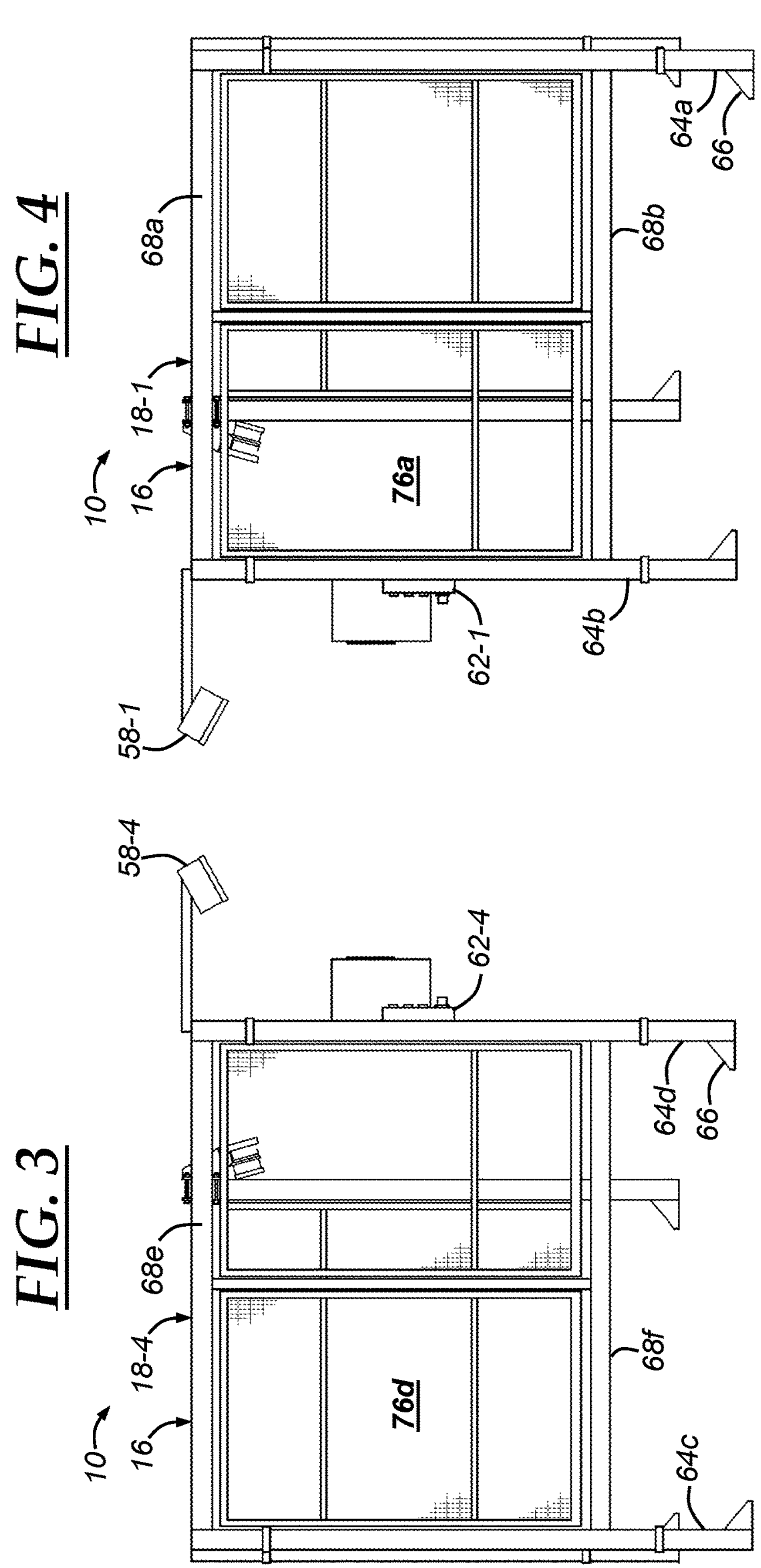
FIG. 3 is a longitudinal end view of the portion of the glass container forming system of FIG. 2, taken from a first end corresponding to the right end of FIG. 1.
FIG. 4 is a longitudinal end view of the portion of the glass container forming system of FIG. 2, taken from a second end corresponding to the left end of FIG. 1.

With reference to FIGS. 3 and 4, there are shown side perspective views of the system glass container forming system 10, particularly of a right (FIG. 3) side and a left side (FIG. 4) taken when viewing the system 10 from the perspective of the equipment area 30 as shown in FIG. 1.

Figure 5:
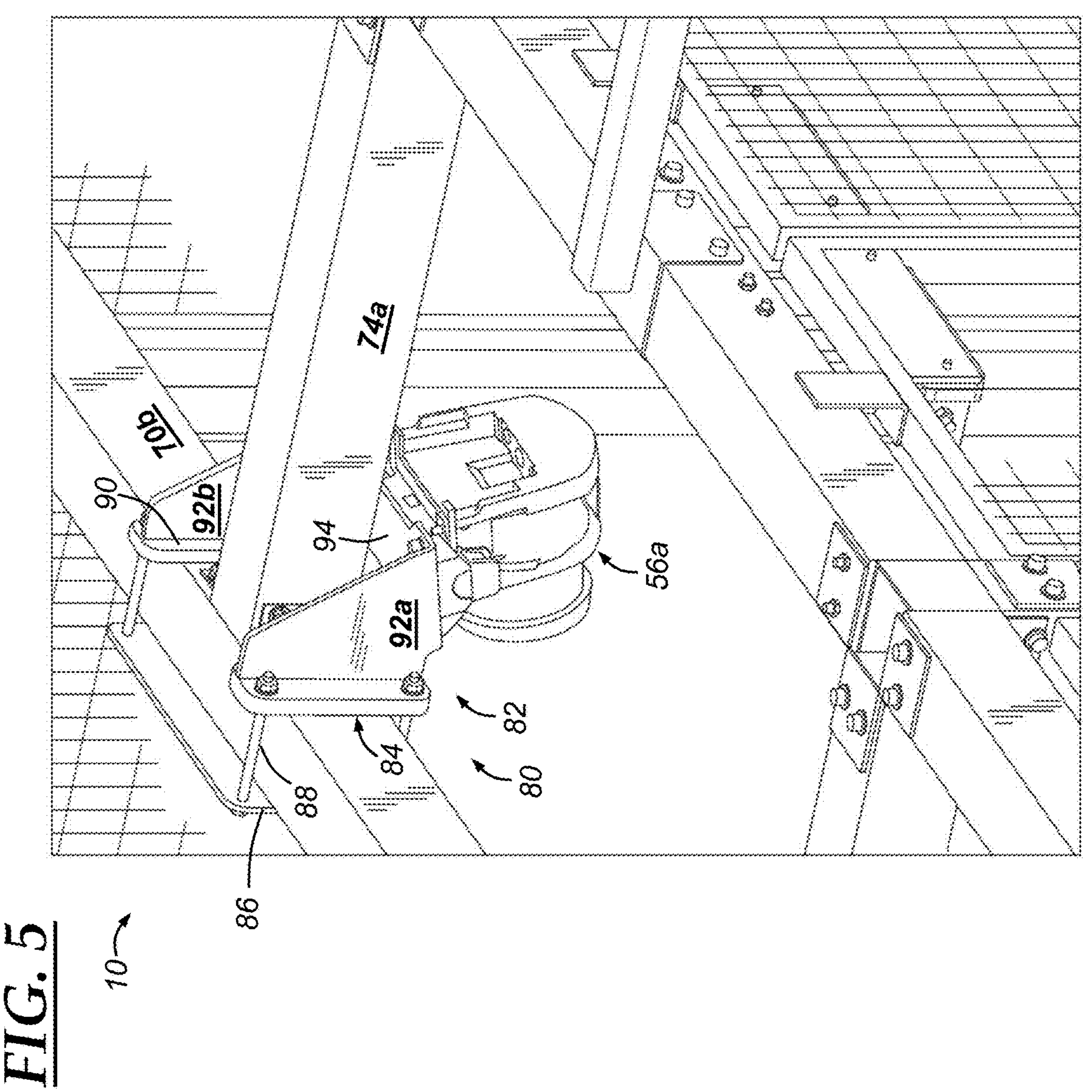
FIG. 5 is a fragmentary perspective view of a portion of the glass container forming system of FIG. 1, particularly, showing zone partitioning of the glass container forming system of FIG. 1.

With reference to FIG. 5, there is shown a downward-looking perspective view showing a detailed portion of the glass container forming system 10 and, in particular, showing a first object detector 56*a* mounted at a junction 80 of a second longitudinal horizontal support 70*b* and a first intermediary lateral horizontal support 74*a*. The first object detector 56*a* is mounted using a mounting bracket 82 having a main plate 84, a backplate 86, and bolts 88 for securing the plates toward one another and against the second longitudinal horizontal support 70*b*. The main plate 84 includes an object detector mounting portion 90 having flange arms 92*a*,92*b* extending generally downward and holding an object detector mounting plate portion 94 therebetween to which the first object detector 56*a* is mounted. The other object detectors 56*b* and 56*c* may be mounted to the zone partitioning using a mounting backet configured in the same manner as the mounting bracket 82 discussed above.

Figure 6:
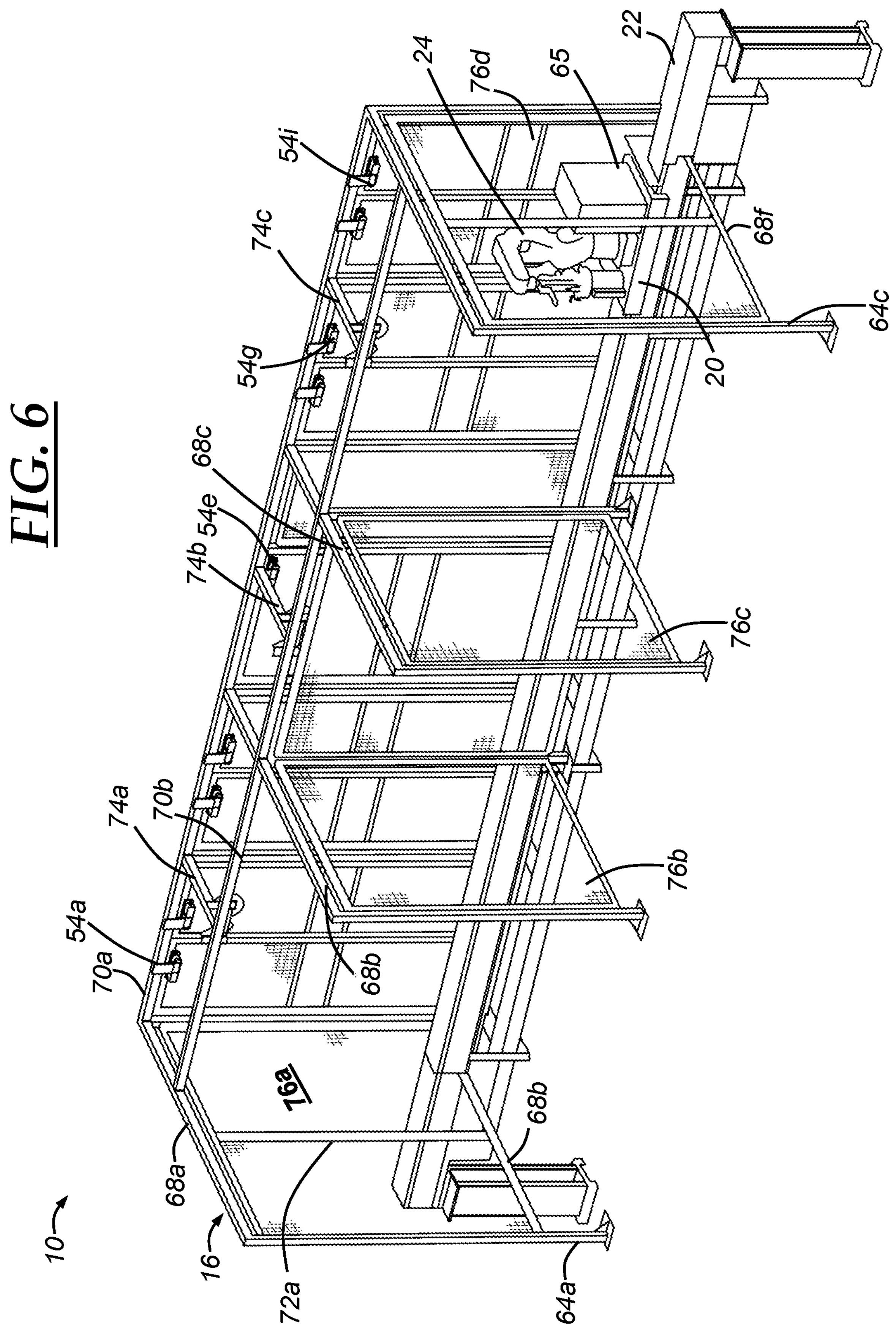
FIG. 6 is another perspective view of a portion of the glass container forming system of FIG. 1, particularly, showing the portion of the glass container forming system of FIG. 2 and other portions of the glass container forming system of FIG. 1, including a longitudinal rail, carriage, and robot.

With reference to FIG. 6, there is shown the portion of the glass container forming system 10 of FIG. 2 and other portions of the glass container forming system 10 of FIG. 1, including the longitudinal rail 22, the carriage 20, and the robot 24. The carriage 20 may be moved along the longitudinal rail 22 along a robot access pathway defined as the area surrounding the longitudinal rail 22 and extending between the robot stations 34.

With reference to FIG. 7, there is shown a method 200 of performing an operator access tagout procedure for permitting an operator to access an equipment area of a glass container forming machine. In embodiments, the method 200 is performed by the glass container forming system 10. The method 200 is discussed below with reference to an example in which the method 200 is performed for permitting an operator access to the equipment area 30-2 of the second workstations 12-2 (FIG. 1). Moreover, while the method 200 is generally discussed as being performed by the coordination controller 52 (FIG. 1), according to embodiments, the method 200 is performed by one or more other portions of the control system 26 in addition to or in lieu of the coordination controller 52.

The method 200 begins with step 202, wherein a program stop request for a workstation is received from an operator. The program stop request is a request to stop operation of equipment in the equipment area of the workstation. In embodiments, the program stop request is received from an operator via the workstation user interface 58-2 through pressing an associated program stop request pushbutton, for example. The method 200 continues to step 204.

In step 204, a position of the carriage is identified. As discussed above, the carriage 20 is moveable along the longitudinal rail 22 between a plurality of positions. In embodiments, the carriage motor controller 48 is aware of the position of the carriage 20 and a carriage position indicator may be transmitted from the carriage motor controller 48 to the coordination controller 52. The method 200 continues to step 206.

In step 206, it is determined whether the carriage is positioned in the workstation. In the present example (where the program stop request is received at the second workstation 12-2), it is determined whether the carriage is positioned in the second workstation 12-2. As shown in FIG. 1, the carriage 20 is positioned in the second workstation 12-2 and this would return a positive result. When it is determined that the carriage is positioned in the workstation, the method 200 continues to step 208 whereat the method 200 waits until it is determined the carriage is no longer positioned at the workstation; otherwise, when it is determined that the carriage is not positioned in the workstation, the method 200 continues to step 210.

In step 210, a manual service request for equipment at the workstation is received. The manual service request is a request to perform a manual swab or other manual servicing of the equipment and/or robot. In embodiments, the manual service request is received from an operator via the workstation user interface 58-2 through pressing an associated manual service request pushbutton, for example. The method 200 continues to step 212.

In step 212, the equipment is operated into a servicing position and, in the present embodiment, the servicing position includes a position in which a blank or mold of the glass container forming machine is moved into a manual swabbing position or other predefined position. In embodiments, parison mold halves are opened so as to receive lubricant applied manually by the operator. In embodiments, the coordination controller 52 sends a signal to the equipment system controller 60, which causes the glass container forming machine 14-2 to operate into a servicing position. The method 200 continues to step 214.

In step 214, a door open request is received for an access door of the workstation. The door open request is a request from an operator to unlock or otherwise permit an access door to be opened. In embodiments, the door open request is received from an operator via the workstation user interface 58-2 through pressing an associated door open request pushbutton, for example. The method 200 continues to step 216.

In step 216, the access door is unlocked, such as through switching open a safety interlock switch implemented using an electromagnetic locking mechanism. In embodiments, the coordination controller 52 sends a door open command to a door interlock of the door interlock module 54-2, which causes the door interlock to unlock. The method 200 continues to step 218.

In step 218, an operator services the workstation, such as by performing a swabbing of the glass container forming machine or inspection of the robot, for example. The method 200 continues to step 220.

In step 220, it is determined that the servicing by the operator is done. In embodiments, this determination is made on the basis that the access door is closed and/or that the operator provided a servicing complete indication, such as by pressing an ARM button on the workstation user interface 58-2. When it is determined that the servicing by the operator is done, the method 200 continues to step 222.

In step 222, the access door is locked into a close position. In embodiments, the door interlock module 54, specifically the door interlock module 54*c* in the present example, is locked in response to receiving a door lock signal. The door lock signal is a signal instructing the door interlock module 54 to lock the door. In embodiments, the coordination controller 52 transmits the door lock signal to the door interlock module 54, which thereby places its door interlock into a locked state. The method 200 continues to step 224.

In step 224, a selected number of glass containers formed by the glass container forming machine of the workstation are rejected. After servicing of the glass container forming machine and/or other portions of the workstation, a number of glass containers formed by the glass container forming machine are rejected and may be discarded. In embodiments, the selected number of glass containers to reject is predetermined. The method 200 then ends.

With reference to FIG. 8, there is shown a method 300 of performing an operator emergency access procedure for permitting an operator to access an equipment area of a glass container forming machine. In embodiments, the method 300 is performed by the glass container forming system 10. The method 300 is discussed below with reference to an example in which the method 300 is performed for permitting an operator access to the equipment area 30-2 of the second workstations 12-2 (FIG. 1). Moreover, while the method 300 is generally discussed as being performed by the coordination controller 52 (FIG. 1), according to embodiments, the method 300 is performed by one or more other portions of the control system 26 in addition to or in lieu of the coordination controller 52.

The method 300 begins with step 302, wherein an emergency stop request for a workstation is received from an operator. The emergency stop request is a request to immediately stop operation of equipment in the equipment area of the workstation. In embodiments, the emergency stop request is received from an operator via the workstation user interface 58-2 through pressing an associated emergency stop request pushbutton, for example. The method 300 continues to step 304.

In step 304, a position of the carriage is identified and, in step 306, it is determined whether the carriage is positioned in the workstation. Steps 304 and 306 are analogous to steps 204 and 206 of the method 200 and that discussion is hereby incorporated and attributed to steps 304 and 306, respectively. The method 300 continues to step 308.

In step 308, when it is determined that the carriage is not positioned in the workstation, the carriage is configured to operate so as to avoid moving to and/or through the workstation. In embodiments, the coordination controller 52 sends a workstation avoidance signal to the carriage motor controller 48. The workstation avoidance signal is a signal that indicates a workstation to avoid and/or otherwise causes the carriage motor controller to operate the electric carriage motor so as to avoid an indicated workstation. The method 300 continues to step 314.

In step 310, when it is determined that the carriage is positioned in the workstation, the carriage moves out of the workstation. In embodiments, the coordination controller 52 sends a carriage position request to the carriage motor controller 48; in response to receiving the carriage position request, the carriage motor controller 48 operates the electric carriage motor 50 to move the carriage 20 along the rail 22 and out of the workstation, such as to another workstation. In some embodiments, prior to the carriage position request being sent, it may be determined whether the robot 24 is servicing the glass container forming machine 14-2 (or performing some other predefined operation), then the robot 24 is directed to stop the operation. After the robot 24 stops operation, then the carriage 20 is moved along the rail 22 and out of the workstation 12-2. The method 300 continues to step 312.

In step 312, operation of the glass container forming machine (or other equipment) of the workstation is stopped. In embodiments, the coordination controller 52 sends an operation stop command to the equipment system controller 60, which causes the glass container forming machine 14-2 of the workstation 12-2 to stop operation so that the glass container forming processing is halted. The method 300 continues to step 314.

In step 314, the equipment is operated into a maintenance position and, in the present embodiment, the maintenance position includes a position in which a blank or mold of the glass container forming machine is moved into a maintenance position or other predefined position. In embodiments, the coordination controller 52 sends a signal to the equipment system controller 60, which causes the glass container forming machine 14-2 to operate into a maintenance position. The method 300 continues to step 316.

In step 316, a door open request is received for an access door of the workstation; then, in step 318, the access door is unlocked. Steps 316 and 318 are analogous to steps 214 and 216 and that discussion is hereby incorporated and attributed to the steps 316 and 318, respectively. The method 300 continues to step 320.

In step 320, an operator services the workstation, such as by performing maintenance or inspection of the glass container forming machine. The method 300 continues to step 322.

In step 322, it is determined that the servicing or maintenance by the operator is done. In embodiments, this determination is made on the basis that the access door is closed and/or that the operator provided a servicing complete indication, such as by pressing an ARM button on the workstation user interface 58-2. When it is determined that the servicing by the operator is done, the method 300 continues to step 324.

In step 324, the access door is locked into a close position; and, in step 326, a selected number of glass containers formed by the glass container forming machine of the workstation are rejected. Steps 324 and 326 are analogous to steps 222 and 224 and that discussion is hereby incorporated and attributed to the steps 324 and 326, respectively. The method 300 then ends.

According to embodiments, at step 310, the operation of equipment, such as a glass container forming machine, in an adjacent workstation are directed to stop or disable operation. For example, a stop operation signal is sent from the coordination controller 52 to the system equipment controller 60, which may include sending the stop operation signal to a controller used to operate the glass container forming machine of the adjacent workstation. In one example where the workstation is the second workstation 12-2, a stop operation signal may be generated and sent to the controller of the glass container forming machine of the one or more adjacent workstations thereby causing the glass container forming machine to stop operation.

With reference to FIG. 9, there is shown a method 400 of performing an operator access tagout procedure for permitting an operator to access a servicing robot used for servicing a glass container forming machine. In embodiments, the method 400 is performed by the glass container forming system 10. The method 400 is discussed below with reference to an example in which the method 400 is performed for permitting an operator access to the robot station 34-2 of the second workstations 12-2 (FIG. 1). Moreover, while the method 400 is generally discussed as being performed by the coordination controller 52 (FIG. 1), according to embodiments, the method 400 is performed by one or more other portions of the control system 26 in addition to or in lieu of the coordination controller 52.

The method 400 begins with step 402, wherein a stop robot request is received from an operator. The stop robot request is a request to stop operation of the robot. In embodiments, the stop robot request is received from an operator via the system user interface 62. However, in other embodiments, another human machine interface (HMI) may be used to receive the stop robot request, such as one of the workstation user interfaces 58, for example. The method 400 continues to step 404.

In step 404, a position of the carriage is identified. Step 404 is analogous to step 204 of the method 200 and that discussion is hereby incorporated and attributed to step 404. The method 400 continues to step 404.

In step 406, it is determined whether the robot is operating within any of the plurality of workstations. In one embodiment, the coordination controller 52 receives a carriage position signal from the carriage motor controller 48, where the carriage position signal indicates the position of the carriage, such as through indicating a numerical value representing the position or a value indicating a station selected from a plurality of predefined stations. In one embodiment, the coordination controller 52 receives a robot state signal indicating a state of the robot 24, such as an operation being performed by the robot 24. When it is determined that the carriage is positioned at any of the workstations, the method 400 continues to step 408; otherwise, when it is determined that the carriage is not positioned in the workstation, the method 400 continues to step 410.

In step 408, when it is determined that the carriage is positioned in one of the workstations, the method waits for the robot to finish the operation being performed by the robot. The method 400 continues to step 404.

In step 410, the robot is moved into a maintenance position. The maintenance position is a predefined position in which the robot is placed prior to performing maintenance on the robot. In one embodiment, the maintenance position is defined to be at a particular one of the workstations 12, such as the second workstation 12-2, and the robot 24 is moved into the maintenance position through moving the carriage 20 along the rail 22 to the designated maintenance position. In addition to and/or in lieu of moving the carriage 20, the robot 24 is operated so as to be placed into a robot maintenance position, such as a predetermined position of the robot arm 36, for example. In embodiments, the robot 24 is disabled by interrupting an electric power supply to or of the robot so that the robotic arm 36 is not powered for movement. The method 400 continues to step 412.

In step 412, an access door corresponding to the maintenance position of the robot (or carriage) is unlocked so that it may be opened. In embodiments, the coordination controller 52 causes the access door to become unlocked, such as through switching open a safety interlock switch implemented using an electromagnetic locking mechanism. This step is analogous to step 216 of the method 200 and that discussion is hereby incorporated and attributed to step 412. The method 400 continues to step 414.

In step 414, an operator performs maintenance on the robot, such as by performing inspecting the robot, adjusting the robot, refilling oil or lubricant of the robot, refilling lubricant of the lubricant tank 42, etc., to name a few examples. The method 400 continues to step 416.

In step 416, it is determined that the maintenance by the operator is done. In embodiments, this determination is made on the basis that the access door is closed and/or that the operator provided a servicing complete indication, such as by pressing an ARM button on the workstation user interface 58-2. When it is determined that the maintenance by the operator is done, the method 400 continues to step 418.

In step 418, the access door is locked into a close position and, in step 420, a selected number of glass containers formed by the glass container forming machine of the workstation are rejected. These steps are analogous to steps 222 and 224 of the method 200 and that discussion is hereby incorporated and attributed to steps 418 and 420, respectively. The method 400 then ends.

With reference to FIG. 10, there is shown a method 500 of performing an operator emergency access procedure for permitting an operator to access a servicing robot used for servicing a glass container forming machine. In embodiments, the method 500 is performed by the glass container forming system 10. The method 500 is discussed below with reference to an example in which the method 500 is performed for permitting an operator access to the robot station 34-2 of the second workstations 12-2 (FIG. 1). Moreover, while the method 500 is generally discussed as being performed by the coordination controller 52 (FIG. 1), according to embodiments, the method 500 is performed by one or more other portions of the control system 26 in addition to or in lieu of the coordination controller 52.

The method 500 begins with step 502, wherein an emergency stop request for a workstation is received from an operator. This step is analogous to step 302 of the method 300 (FIG. 8), and that discussion is hereby incorporated and attributed to step 502. In embodiments, however, the workstation user interface 58-2 may include a robot emergency stop request button that, when pressed, results in a robot emergency stop request being received. The robot emergency stop request may be different than an emergency stop request for the system equipment (e.g., glass container forming machine 14). The method 500 continues to step 504.

In step 504, operation of the robot is stopped. In embodiments, the coordination controller 52 sends an operation stop command to the robot controller 46, which causes the robot 24 to stop operation. The method 500 continues to step 506.

In step 506, operation of the glass container forming machine of the workstation is stopped. In embodiments, the coordination controller 52 sends an operation stop command to the equipment system controller 60, which causes the glass container forming machine 14-2 of the workstation 12-2 to stop operation so that the glass container forming processing is halted. The method 500 continues to step 508.

In step 508, the equipment is operated into a standby position and, in the present embodiment, the standby position includes a position in which the glass container forming machine, such as a blank or mold thereof, is moved into a standby position, which may be any predefined position and, in embodiments, corresponds to the maintenance position. In one embodiment, the coordination controller 52 sends a signal to the equipment system controller 60, which causes the glass container forming machine 14-2 to operate into the standby position. The method 500 continues to step 510.

In step 510, the robot and the carriage are disabled. In embodiments, the robot 24 is disabled by interrupting an electric power supply to or of the robot so that the robotic arm 36 is not powered for movement. In embodiments, the carriage 20 is disabled by interrupting an electric power supply to or of the electric carriage motor 50. The method 500 continues to step 512.

In step 512, an access door providing access to the robot (or carriage) is unlocked. In embodiments, the position of the carriage is identified and an access door corresponding to the position of the carriage is unlocked; for example, the carriage 20 is identified as being positioned in the second robot station 34-2 and, in response, a door open command is sent from the coordination controller 52 to the door interlock module 54*c* that permits access to the second robot station 34-2. The method 500 continues to step 514.

In step 514, an operator performs maintenance on the robot, such as by performing inspecting the robot, adjusting the robot, refilling oil or lubricant of the robot, refilling lubricant of the lubricant tank 42, etc., to name a few examples. The method 500 continues to step 516.

In step 516, it is determined that the maintenance by the operator is done. In embodiments, this determination is made on the basis that the access door is closed and/or that the operator provided a servicing complete indication, such as by pressing an ARM button on the workstation user interface 58-2. When it is determined that the maintenance by the operator is done, the method 500 continues to step 518.

In step 518, the access door is locked into a close position and, in step 520, a selected number of glass containers formed by the glass container forming machine of the workstation are rejected. These steps are analogous to steps 222 and 224 of the method 200 and that discussion is hereby incorporated and attributed to steps 518 and 520, respectively. The method 500 then ends.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A glass container forming system, comprising:

a plurality of workstations each arranged adjacent to at least one other workstation of the plurality of workstations and each including an equipment area and zone partitioning for the plurality of workstations, wherein, for each of the plurality of workstations, the zone partitioning includes an access doorway that is selectively closed and opened by an access door, wherein each of the plurality of workstations includes a door interlock and a door sensor for the access door, and wherein the door sensor provides a door open indicator that indicates a door closed state or a door open state;

one or more object detectors configured to obtain sensor data of an operator access area, wherein the operator access area is within one or more of the plurality of workstations;

a plurality of glass container forming machines located within the plurality of workstations, wherein each of the plurality of glass container forming machines is located within the equipment area of a different one of the plurality of workstations; and a control system configured to: receive the sensor data from the one or more object detectors, receive the door open indicator from the door sensor of the access door for each of the plurality of workstations, and control an operating state of the glass container forming system based on the door open indicator and the sensor data.

2. The glass container forming system of claim 1, wherein the zone partitioning includes a fence including fence mesh and a frame carrying the fence mesh.

3. The glass container forming system of claim 1, wherein the zone partitioning includes a longitudinal frame that extends between the plurality of workstations.

4. The glass container forming system of claim 3, wherein the longitudinal frame extends along the operator access area, and wherein the access door of each of the plurality of workstations is arranged to provide access to an operator in the operator access area or in one or more other operator access areas.

5. The glass container forming system of claim 4, wherein the zone partitioning includes zone partitions extending laterally with respect to the longitudinal frame and partly defining the plurality of workstations.

6. The glass container forming system of claim 1, further comprising a carriage carrying a robot and being traversable along a rail that runs between a plurality of robot stations, wherein each robot station of the plurality of robot stations is located at one of the plurality of workstations, and wherein the control system is operatively connected to the robot, wherein the control system is configured to control an operating state of the robot.

7. The glass container forming system of claim 6, wherein the rail is a longitudinal rail that extends linearly between the plurality of workstations.

8. The glass container forming system of claim 6, wherein the zone partitioning includes zone partitions defining the robot station and the equipment area for each of the plurality of workstations.

9. The glass container forming system of claim 8, wherein the robot station is located between the equipment area and the access door of each of the plurality of workstations.

10. The glass container forming system of claim 6, wherein the carriage is configured to travel along the rail to the robot station within a first workstation of the plurality of workstations and to service the glass container forming machine of the first workstation.

11. The glass container forming system of claim 1, wherein the glass container forming system includes an additional area without a glass container forming machine between two workstations.

12. The glass container forming system of claim 1, wherein the operating state of the glass container forming system is an operating state of one or more of the glass container forming machines and/or an operating state of an automated robotic swabbing system for the glass container forming machines.

13. The glass container forming system of claim 12, wherein the control system is configured to control the glass container forming machine of at least one of the plurality of workstations based on the sensor data from at least one of the one or more object detectors.

14. The glass container forming system of claim 12, wherein the control system is configured to control the operating state of the automated robotic swabbing system based on the sensor data from the object detector.

15. The glass container forming system of claim 1, further comprising a user interface operatively coupled to the control system and positioned to face the operator access area positioned at one of the plurality of workstations on a side of the access door that is opposite the equipment area so as to be operable by an operator within the operator access area.

16. The glass container forming system of claim 1, wherein the door interlock of at least one of the plurality of workstations is an electronically-controllable lock that is operable between a locked state and an unlocked state.

17. The glass container forming system of claim 1, wherein the zone partitioning extends along at least a perimeter portion of each of the plurality of workstations.

18. A glass container forming system, comprising:

a plurality of workstations each arranged adjacent to at least one other workstation of the plurality of workstations and each including an equipment area and zone partitioning for the plurality of workstations;

a plurality of glass container forming machines located within the plurality of workstations, wherein each of the plurality of glass container forming machines is located within the equipment area of a different one of the plurality of workstations;

an object detector mounted to the zone partitioning and configured to capture sensor data of a first workstation of the plurality of workstations; and a control system configured to receive information from the object detector, and to control an operating state of the glass container forming system based on the captured sensor data.

19. The glass container forming system of claim 18, wherein the zone partitioning includes a longitudinal frame that extends between the plurality of workstations defining an operator access area, and wherein the access door of each of the plurality of workstations are arranged to provide access to an operator in the operator access area.

20. The glass container forming system of claim 19, wherein the zone partitioning includes a plurality of lateral frames each extending orthogonally from the longitudinal frame, and wherein each of the plurality of lateral frames defines a perimeter portion of a corresponding one of the plurality of workstations.

21. The glass container forming system of claim 19, further comprising a carriage traversable along a rail between a plurality of robot stations, wherein each robot station of the plurality of robot stations is located at one of the plurality of workstations, and wherein the rail is located between the equipment area and the access doorway of each of the plurality of workstations.

22. The glass container forming system of claim 18, wherein the zone partitioning includes an access doorway that is selectively closed and opened by an access door, and wherein the door sensor provides a door open indication of either a door closed state and a door open state.

23. A glass container forming system, comprising:

a plurality of workstations each arranged adjacent to at least one other workstation of the plurality of workstations and each including an equipment area, a robot station, and an operator access area;

zone partitioning for the plurality of workstations;

a plurality of glass container forming machines located within the plurality of workstations, wherein each of the plurality of glass container forming machines is located within the equipment area of a different one of the plurality of workstations; and a carriage carrying a robot and being traversable along a rail that runs through the robot station of each of the plurality of workstations, wherein each robot station of the plurality of robot stations is located at one of the plurality of workstations.

* * * * *